UNITED STATES PATENT OFFICE 2,571,370

PREPARATION OF 2,2'-DITHIENYL DISULFIDE

Emil Koft, Jr., Woodbury Heights, N. J., assignor to Socony-Vacuum Oil Company, Incorporated, a corporation of New York No Drawing. Application March 23, 1950, Serial No. 151,535

7 Claims. (Cl. 260—329)

This invention relates to a new and improved method for the preparation of 2,2'-dithienyl disulfide.

This compound has heretofore been prepared only by circuitous procedures involving the preparation of an intermediate thiophene derivative.

In accordance with the present invention, it has now been discovered that 2,2'-dithienyl disulfide may be produced in attractive yields and in a straightforward manner directly from thiophene. More particularly, it has been found that when thiophene and sulfur monochloride are reacted under conditions such that an excess of thiophene is present in the reaction mixture, a product of 2,2'-dithienyl disulfide is obtained.

The overall reaction taking place is represented by the following equation:

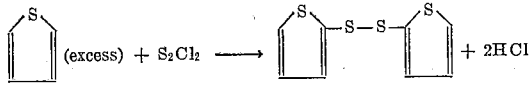

It will be seen from the foregoing that the theoretical molar ratio to produce 2,2'-dithienyl disulfide is 2 moles of thiophene to 1 mole of sulfur monochloride. It has been found, however, that the yield of dithienyl disulfide is unexpectedly increased by the addition of sulfur monochloride to thiophene and the maintenance of a large excess of thiophene in the resulting mixture during the course of reaction.

The molar ratio of thiophene to sulfur monochloride employed in the process of this invention is accordingly greater than 2, and preferably greater than about 5. The upper limit of the amount of thiophene present in the reaction mixture appears to be governed only by economic considerations. However, as a practical matter, the molar ratio of thiophene to sulfur monochloride will generally not exceed about 20.

The temperature at which the reaction is carried out is ordinarily within the range of about 20° C. to about 135° C. although temperatures outside of this range may, with the use of pressure or other modified conditions, be found to be desirable in some instances. Generally, the reaction is effected under ordinary pressure conditions and at a reflux temperature within the range of about 75° C. to about 85° C.

The product of 2,2'-dithienyl disulfide obtained by the instant process is useful as a chemical intermediate. In particular, the dithienyl disulfide is useful in providing a material which can be easily converted to 2-thiophenethiol which, in turn, finds use as a peptizing agent in reclaiming rubber, as a pharmacuetical intermediate, as a reactant in the preparation of numerous mineral oil additives and as a starting material for the synthesis of a multiude of thiophene derivatives. The product of 2-thiophenethiol is easily and readily obtained by reduction of 2,2'-dithienyl disulfide. The reaction taking place proceeds in accordance with the following equation:

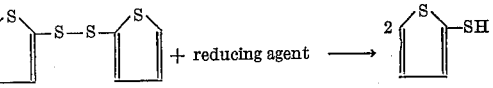

The desired reduction may be accomplished with the use of zinc and dilute hydrochloric acid or with any of the other conventional reducing agents such as iron and dilute acid, alkali, various metals commonly used for that purpose, catalytic reduction, etc.

A particularly convenient method for obtaining 2-thiophenethiol from 2,2'-dithienyl disulfide is the addition of a reducing agent directly into the vessel in which the dithienyl disulfide has been prepared. Thus, after reacting excess thiophene and sulfur monochloride as above described to give a reaction product of 2,2'-dithienyl disulfide, zinc, and dilute hydrochloric acid or other reducing agent is added to the vessel containing 2,2'-dithienyl disulfide to yield a resulting product of 2-thiophenethiol.

Having described in a general way the nature of this invention, the following specific examples are given by way of illustration:

EXAMPLE 1

*Preparation of 2,2'-dithienyl disulfide*

Eight hundred forty parts by weight of thiophene were placed in a reaction vessel and 135 parts by weight of sulfur monochloride were added dropwise over a period of 3 hours, the reaction temperature being maintained at 75-82° C. The molar ratio of thiophene to sulfur monochloride in the reaction mixture was 10 to 1. Hydrogen chloride was evolved during the course of the reaction. The mixture was maintained at gentle reflux with agitation for 9 hours, after which time only traces of hydrogen chloride could be detected. The resulting reaction product was water-washed until neutral and unreacted thiophene was removed by distillation. Two hundred twenty parts by weight of a residual product of dithienyl disulfide were obtained.

Reduction of 2,2'-dithienyl disulfide to 2-thiophenethiol

Fifty parts by weight of the dithienyl disulfide above obtained, 100 parts of zinc dust, and 200 parts of water were placed in a reaction vessel and heated to reflux. Two hundred thirty-eight parts by weight of hydrochloric acid (specific gravity 1.19) were slowly added over a period of 2 hours with vigorous stirring. After 5 hours, 30 parts by weight of a yellow liquid product were obtained. This liquid was characterized as 2-thiophenethiol by its 2,4-dinitrophenyl sulfide, which had a sulfur content of 22.5% (theoretical sulfur content 22.6%) and a melting point of 116–117° C. (literature melting point 119° C.).

EXAMPLE 2

Preparation of 2,2'-dithienyl disulfide

Four hundred twenty parts by weight of thiophene were placed in a reaction vessel and heated to a temperature of 78–82° C. With rapid agitation of the thiophene, 135 parts by weight of sulfur monochloride were slowly added over a period of 2 hours. The molar ratio of thiophene to sulfur monochloride in the reaction mixture was thus 5 to 1. The mixture was heated for 6 hours at gentle reflux (84° C.), after which time only traces of hydrogen chloride could be detected. The resulting reaction mixture was cooled and poured into ice water. The resulting organic layer was removed, water-washed until neutral, filtered, and the excess thiophene was removed therefrom by distillation. One hundred seventy-four parts by weight of 2,2'-dithienyl disulfide were obtained.

Reduction of 2,2'-dithienyl disulfide to 2-thiophenethiol

Fifty parts by weight of the dithienyl disulfide above obtained, 100 parts of zinc dust, and 200 parts of water were placed in a reaction vessel and heated to reflux. Two hundred thirty-eight parts by weight of hydrochloric acid were slowly added over a period of 2 hours with vigorous stirring. After 5 hours, 15 parts by weight of 2-thiophenethiol were obtained. This material was characterized by its 2,4-dinitrophenyl sulfide melting at 115° C.

EXAMPLE 3

Preparation of 2,2'-dithienyl disulfide

One hundred sixty-eight parts by weight of thiophene and 168 parts by weight of an inert diluent of toluene were placed in a reaction vessel and heated to 84° C. Sixty-eight parts by weight of sulfur monochloride were added dropwise over a period of 2 hours to the reaction vessel. The molar ratio of thiophene to sulfur monochloride was 4 to 1. The mixture was heated 9 hours, with stirring, at a temperature of 84° C., after which time only traces of hydrogen chloride were evolved. The mixture was thereafter poured into ice water. The resulting organic layer was filtered and water-washed until neutral. Unreacted thiophene and toluene were removed by distillation. Seventy-five parts by weight of 2,2'-dithienyl disulfide were obtained.

Reduction of 2,2'-dithienyl disulfide to 2-thiophenethiol

Fifty parts by weight of the 2,2'-dithienyl disulfide above obtained were reduced by a procedure similar to that described in the foregoing examples. Fourteen parts by weight of thiophenethiol were obtained. This material was characterized by its 2,4-dinitrophenyl sulfide melting at 115° C.

It will be apparent from the above examples that 2,2'-dithienyl disulfide may be obtained in an attractive yield by adding sulfur monochloride to an excess of thiophene. Increased yields of 2,2'-dithienyl disulfide were obtained with the use of a greater excess of thiophene. This is evident, not only from the amount of 2,2'-dithienyl disulfide obtained but also from the amount of 2-thiophenethiol realized upon reduction of the dithienyl disulfide. Thus, in Example 1, wherein the molar ratio of thiophene to sulfur monochloride was 10, reduction of the resulting reaction mixture gave 2-thiophenethiol in 57% yield. In Example 2, wherein the molar ratio of thiophene to sulfur monochloride was 5, reduction of the resulting reaction mixture gave a 29.5% yield of 2-thiophenethiol. In Example 3, wherein the molar ratio of thiophene to sulfur monochloride was 4, reduction of the resulting reaction mixture gave a 28% yield of 2-thiophenethiol.

In addition to the preparation of 2,2'-dithienyl disulfide and the reduction product of 2-thiophenethiol obtained therefrom, it is contemplated that the process described herein may likewise be used for the preparation of substituted dithienyl disulfides and substituted thiophene thiols by the use of a substituted thiophene as the initial reactant. Thus, in place of the thiophene reactant above described, alkyl thiophenes, acyl thiophenes, amino thiophenes, chlorothiophenes, and various other thiophene derivatives having substituents in any or all of the 3,4, or 5-positions of the thiophene nucleus may be employed as reactants in the procedure described herein.

I claim:

1. A process for preparing 2,2'-dithienyl disulfide, which comprises the addition of sulfur monochloride to thiophene in the absence of a catalyst, said thiophene being maintained in excess during the course of reaction and present in such amount that the overall molar ratio of thiophene to sulfur monochloride is greater than 2.

2. A process for preparing 2,2'-dithienyl disulfide, which comprises the addition of sulfur monochloride to thiophene in the absence of a catalyst, said thiophene being maintained in excess during the course of reaction and present in such amount that the overall molar ratio of the thiophene to sulfur monochloride is greater than about 5.

3. A process for preparing 2,2'-dithienyl disulfide, which comprises the addition of sulfur monochloride to thiophene in the absence of a catalyst, said thiophene being maintained in excess during the course of reaction and present in such amount that the molar ratio of thiophene to sulfur monochloride is between 2 and about 20.

4. A process for preparing 2,2'-dithienyl disulfide, which comprises the addition of sulfur monochloride to thiophene in the absence of a catalyst, said thiophene being maintained in excess during the course of reaction and present in such amount that the molar ratio of thiophene to sulfur monochloride is between about 5 and about 20.

5. A process for preparing 2,2'-dithienyl disulfide, which comprises the reaction of sulfur monochloride and thiophene in the absence of a catalyst at a temperature between about 20° C. and about 135° C., said thiophene being maintained in excess during the course of reaction and present in such amount that the overall molar ratio of thiophene to sulfur monochloride is greater than 2.

6. A process for preparing 2,2'-dithienyl disulfide, which comprises the reaction of sulfur monochloride and thiophene in the absence of a catalyst at a temperature between about 20° C. and about 135° C., said thiophene being maintained in excess during the course of reaction and present in such amount that the overall molar ratio of thiophene to sulfur monochloride is greater than about 5.

7. A process for preparing 2,2'-dithienyl disulfide, which comprises the reaction of sulfur monochloride and thiophene in the absence of a catalyst at a temperature between about 75° C. and about 85° C., said thiophene being maintained in excess during the course of reaction and present in such amount that the overall molar ratio of thiophene to sulfur monochloride is between about 5 and about 20.

EMIL KOFT, Jr.

REFERENCES CITED

The following references are of record in the file of this patent:

UNITED STATES PATENTS

| Number | Name | Date |
|---|---|---|
| 2,474,849 | Kleiman | July 5, 1949 |
| 2,504,903 | Sturgis | Apr. 18, 1950 |

OTHER REFERENCES

Beilstein, Handbuch der Organische Chemie, supplement to vol. 6, p. 148 (1931); vol. 6, pp. 323, 324 (1923).